(12) United States Patent
Lee et al.

(10) Patent No.: US 8,166,019 B1
(45) Date of Patent: Apr. 24, 2012

(54) PROVIDING SUGGESTED ACTIONS IN RESPONSE TO TEXTUAL COMMUNICATIONS

(75) Inventors: Woo Jae Lee, Manhattan, KS (US); Peter Syromiatnikov, Overland Park, KS (US); Sanjay K. Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 946 days.

(21) Appl. No.: 12/176,776

(22) Filed: Jul. 21, 2008

(51) Int. Cl.
*G06F 7/00* (2006.01)
*G06F 17/30* (2006.01)

(52) U.S. Cl. ............ 707/708; 707/771; 707/963; 705/5; 705/7.18; 715/962; 715/963

(58) Field of Classification Search ........... 707/999.003, 707/999.107, 708, 771, 951, 769; 705/5, 705/7.18
See application file for complete search history.

(56) References Cited

U.S. PATENT DOCUMENTS

| | | | | |
|---|---|---|---|---|
| 6,505,167 | B1 * | 1/2003 | Horvitz et al. | 705/7.21 |
| 6,836,768 | B1 * | 12/2004 | Hirsch | 715/225 |
| 6,868,426 | B1 * | 3/2005 | Mankoff | 1/1 |
| 7,158,980 | B2 * | 1/2007 | Shen | 1/1 |
| 7,483,869 | B2 * | 1/2009 | Kumar | 706/47 |
| 7,584,253 | B2 * | 9/2009 | Curbow et al. | 709/206 |
| 2004/0243422 | A1 * | 12/2004 | Weber et al. | 705/1 |
| 2006/0287881 | A1 * | 12/2006 | Fitzgerald et al. | 705/1 |
| 2007/0075136 | A1 * | 4/2007 | Jacob | 235/383 |
| 2007/0100962 | A1 * | 5/2007 | Barth et al. | 709/217 |
| 2008/0115149 | A1 * | 5/2008 | Rupp et al. | 719/318 |
| 2009/0106077 | A1 * | 4/2009 | Bhogal et al. | 705/9 |

* cited by examiner

*Primary Examiner* — Kuen Lu
*Assistant Examiner* — Susan F Rayyan (57) ABSTRACT

A system, method, and computer-readable media are described for suggesting an action based on multiple descriptors within a textual communication (e.g. email, text message). In one embodiment, event descriptors within an email are identified and displayed to the email recipient with an indication that the descriptors are selectable. Upon receiving the selection of at least two descriptors, an action is suggested to the recipient for acceptance. Upon receiving the acceptance, the proposed action is performed.

16 Claims, 8 Drawing Sheets

FROM: JOE
TO: BOB
CC:
SUBJECT: PARTY

SENT: JUNE 16, 2008

DEAR BOB,

318 ⎱ I AM HAVING PARTY AT MY HOUSE TO CELEBRATE MARY'S
312  316  314
BIRTHDAY AT 7:00 PM NEXT TUES. MY H[
WILL BE ABLE TO MAKE IT.
10331 GILMORE BLVD ~322
LEAWOOD, KS 66206
(913)555-6281 ~324
CALL IF YOU NEED DIRECTIONS.
-JOE

310

○ CREATE A CALENDAR ENTRY? ~510

○ GET DIRECTIONS ~520

○ GENERATE NEW ACTION ~530
   TEMPLATE

PROVIDING SUGGESTED ACTIONS IN RESPONSE TO TEXTUAL COMMUNICATIONS

SUMMARY

The present invention is defined by the claims below. Embodiments of the present invention suggest actions to take in response to receiving a textual communication (e.g., email, text message). The suggested actions are based on information identified within the textual communication. Embodiments of the present invention have several practical applications in the technical arts including automatically performing multiple actions that help the user respond to a textual communication, including extracting and storing information communicated in the textual communication. In one embodiment, the system determines that the textual communication describes an event and automatically generates a calendar entry populated with multiple types of event information. In this embodiment, the suggested action is saving the calendar entry.

In a first illustrative embodiment, one or more computer-readable media having computer-executable instructions embodied thereon for performing a method of performing an action in response to identifying information within a textual communication are provided. The method includes receiving the textual communication. The textual communication does not originate from an electronic calendar. The method also includes identifying a physical location within the textual communication and identifying temporal information within the textual communication. The method further includes determining that the physical location and the temporal information correspond to a template, wherein the template is associated with a suggested action. The method also includes displaying a user interface to a recipient of the textual communication that allows the recipient to request performance of the suggested action.

In another illustrative embodiment, one or more computer-readable media having computer-executable instructions embodied thereon for performing a method of generating an entry in a personal information manager based on information in a textual communication are provided. The method includes receiving the textual communication and identifying a plurality of event descriptors within the textual communication, wherein an event descriptor is text describing characteristics of an event, and wherein the event is associated with at least a physical location and a time period. The method also includes displaying the textual communication to a recipient with the plurality of event descriptors displayed as selectable, wherein the plurality of event descriptors appearance is changed to indicate the plurality of event descriptors are capable of selection by the recipient. The method further includes receiving a first selection of a first event descriptor from the plurality of event descriptors, wherein the first event descriptor describes the physical location associated with the event. The method also includes receiving a second selection of a second event descriptor from the plurality of event descriptors, wherein the second event descriptor describes a time associated with the event and displaying, to the recipient, a suggested entry based on the first selection and the second selection.

In a third illustrative embodiment, one or more computer-readable media having computer-executable instructions embodied thereon for performing a method of performing an action in response to identifying information within a textual communication. The method includes receiving the textual communication, wherein the textual communication is one of a text message and an email and identifying a plurality of descriptors, wherein a descriptor is text within the textual communication. The method also includes displaying the textual communication to a recipient with the plurality of descriptors displayed with an appearance that indicates the plurality of descriptors are selectable and receiving an indication that the recipient selected two or more descriptors. The method further includes determining that the two or more descriptors correspond to a template, wherein the template is associated with a suggested action and displaying a user interface that allows the recipient to request performance of a suggested action.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for identifying information in a textual communication and determining a possible purpose (e.g., party invitation, lunch invite) of the communication by matching the identified information with a template. A suggested action that is associated with the template is suggested to the user. The action associated with the template is consistent with the presumed purpose of the textual communication. In one embodiment, the information is selected by the user and then matched with a template. In another embodiment, information is identified and compared to a group of templates without receiving user input. Templates may be added or modified by the user so that a particular action chosen by the user is suggested upon receiving a textual communication containing information specified by the user.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. Further, various technical terms are used throughout this description. An illustrative resource that fleshes out various aspects of these terms can be found in *Newton's Telecom Dictionary* by H. Newton, 24nd Edition (2008).

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

An Illustrative Operating Environment

Figure 1:
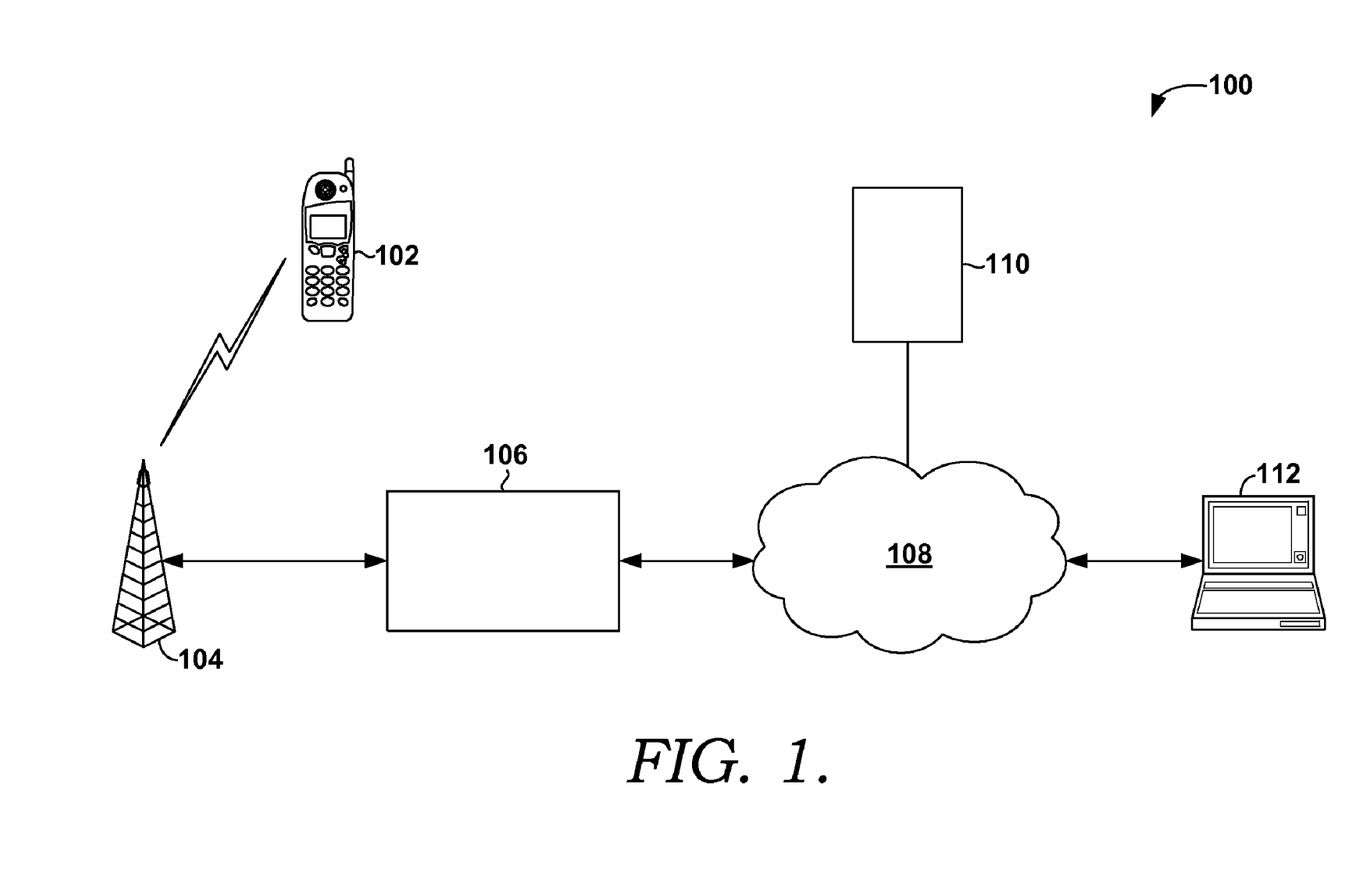
FIG. 1 is a drawing of an illustrative environment in which an embodiment of the present invention may operate.

Embodiments of the present invention may be practiced in a communications network providing service to devices communicatively coupled to the communications network. An illustrative operating environment 100 that contains a few of the components within such a communications network is shown in FIG. 1. The components shown in FIG. 1 are the primary components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and not meant to be limiting.

Illustrative operating environment 100 includes mobile device 102, base station 104, access gateway 106, network 108, email server 110, and communications device 112. The present invention is not limited to embodiments that include a wireless device or a wireless network. However, the present invention may operate in a wireless network and with wireless devices. Accordingly, a wireless network has been included in illustrative operating environment 100 to illustrate one possibility.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory: one or more processors, one or more presentation components such as a display or speaker, input/output (I/O) ports, I/O components, and a power supply such as a battery. Mobile device 102 may communicate via wireless protocols, such as code division multiple access ("CDMA"), global system for mobile communications ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of receiving one or more forms of textual communications. Examples of communications that may be received include text messages, multimedia messages, emails, calendar updates, and task reminders.

The mobile device 102 may be associated with a user. For example, a phone call placed to mobile device 102 would be intended for the user. The user is the ultimate recipient of communications (e.g., emails, phone calls, text messages) and media content sent to mobile device 102.

Base station 104 is a fixed station used for communicating with mobile device 102. Standard air interface protocols, such as code division multiple access ("CDMA"), global system for mobile communications ("GSM"), or time division multiple access ("TDMA"), as well as others, may be used by base station 104 to communicate with mobile device 102. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations.

Access gateway 106 provides a boundary between radio communication functions embodied in one or more radio access systems that form the access-facing portion of illustrative operating environment 100 and the standard internet protocol ("IP") communication functions (including Mobile IP) embodied in the public-network facing portion (e.g., network 108) of illustrative operating environment 100. Access gateway 106 might be, for example, an ASN-GW, a PDSN, a SGSN/GGSN, and the like. In embodiments, access gateway 106 can be coupled with a foreign agent ("FA"). In one embodiment, access gateway 106 provides a home agent ("HA") header data to packets such that packets received by access gateway 106 may be communicated to a HA. Packets might be tunneled to and from a HA over unencrypted IP-in-IP tunneling.

Network 108 may include one or more mobile networks, one or more packet based networks, including the Internet, and the public switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, movies, TV shows, calendar reminders, task reminders and other files containing communicative content.

Email server 110 is a combination of hardware and software for sending, receiving, and storing emails. The hardware aspect includes a computing device that includes a CPU, short-term memory, long-term memory, and one or more network interfaces. A network interface is used to connect to a LAN, WAN (including the Internet), or other variety of communication network, such as network 108. The network interface to the WAN or LAN could be wired, wireless, or both. Software on the email server allows the email server to communicate with other computers connected to a common network through the network interface. The software on the email server facilitates sending, receiving, and storing emails in email boxes. The software enables other computing devices to access the stored email messages. The software may also provide security and authentication functions. The email server includes a variety of computer-readable media and the ability to access and execute instructions contained on the media. The above description of hardware and software is illustrative only; many other features of a voicemail server were not listed so as to not obscure embodiments of the present invention.

Communications device 112 is depicted as a laptop computer. Some lower-level details of communications device 112 are not shown so as to not obscure embodiments of the present invention. For example, communications device 112 may include a bus that directly or indirectly couples the following devices: memory: one or more processors; one or more presentation components such as a display or speaker; input/output (I/O) ports; I/O components; and a power supply such as a battery. Communications device 112 may take on any of a variety of forms. By way of example, communications device 112 may be a mobile telephone, smart phone, laptop computing device, desktop computing device, server, personal digital assistant ("PDA") or any combination of these or other devices. The communications device 112 may be associated with a user. For example, an email sent to communications device 112 would be intended for the user.

Figure 2:
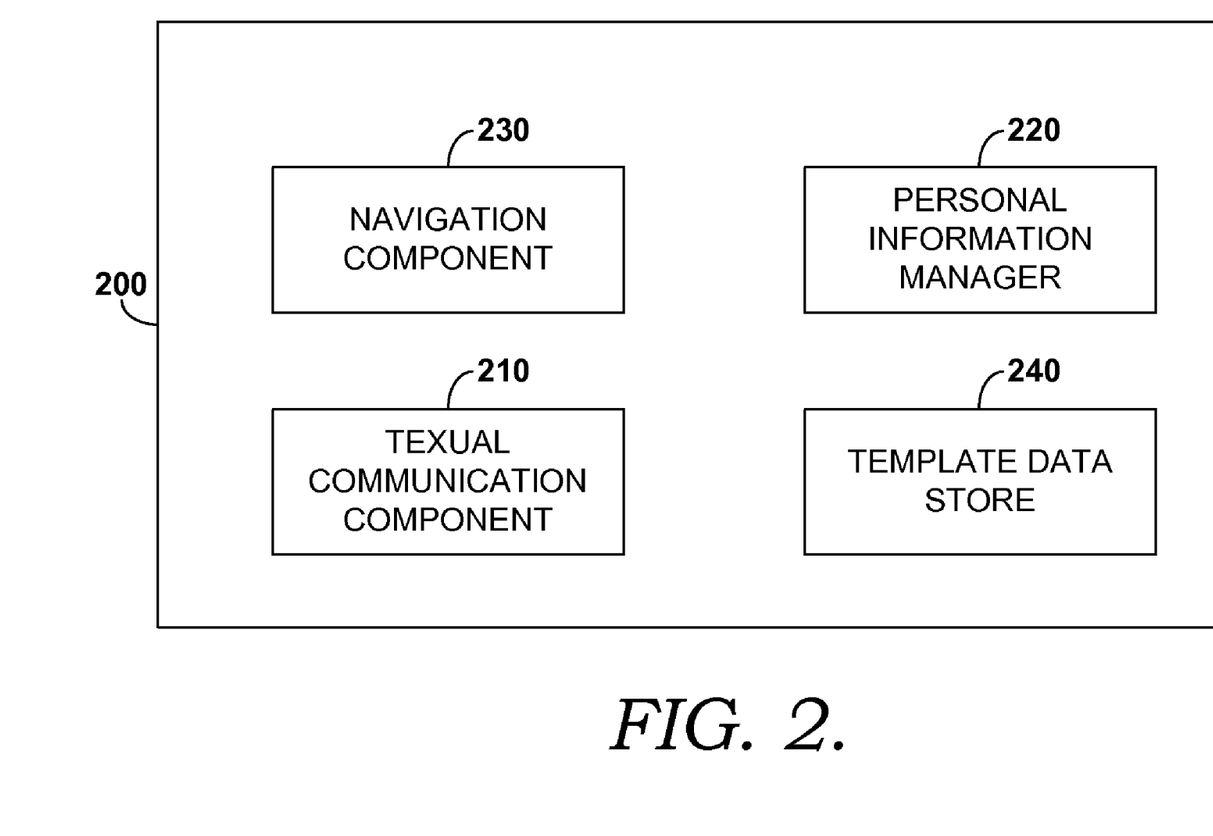
FIG. 2 is a drawing illustrating an exemplary computing system architecture 200 suitable for suggesting an action in response to receiving a textual communication.

Turning now to FIG. 2, a block diagram is illustrated that shows an exemplary computing system architecture 200 suitable for suggesting an action in response to receiving a textual communication, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of the present invention. Neither should the computing system architecture 200 be interpreted as having any dependency or requirement related to any single component/module or combination of component/modules illustrated therein.

Computing system architecture 200 includes textual communication component 210, personal information manager 220, navigation component 230, and template data store 240. Computing system architecture 200 may be a single computing device or a distributed computing environment that includes multiple computing devices coupled with one another via one or more networks. Such networks may include, without limitation, one or more local area networks ("LANs") and/or one or more wide area networks ("WANs"). Such network environments are commonplace in offices, enterprise-wide computer networks, intranets, and the Internet. Accordingly, the network, or combination of networks, is not further described herein.

The textual communication component 210 determines if a textual communication matches a template in template data store 240 and suggests an action associated with the matching template to a user. Each template is associated with one or more suggested actions. In one embodiment, a textual communication is an email, webpage or a text message. A template contains at least two descriptors likely to be found in textual communications having a particular purpose. A descriptor is a series of alphanumeric characters within the text of the textual communication. For example, a descriptor may be a particular word or a series of numbers. A descriptor may be identified by finding an exact match or matching the text to a format. For example, a descriptor could be a word such as "party," or a phrase such as "you are invited" or "store hours." A descriptor could also be a format commonly associated with a date, phone number, or address. For example, a format (xxx) xxx-xxxx, where x is a number between 0 and 9, indicates a phone number. Similarly, xx/xx/xxxx indicates a date.

The template contains at least two descriptors and may contain operators that define a relationship between descriptors. For example, the template could look for a particular word descriptor within five sentences of a second descriptor indicating a date. The template is intended to ascertain a purpose of the textual communication, such as inviting a recipient to a party. The one or more suggested actions associated with the template are actions a user may want to take in response to receiving a textual communication with the supposed purpose of the textual communication.

In one embodiment, the textual communication component 210 receives the textual communication and identifies the descriptors within the textual communication. In one embodiment, the event descriptors are collected from all of the templates within template data store 240 and identified within the textual communication. Thus, a list of event descriptors may be generated by taking each event descriptor from a template in template data store 240 and adding it to the list. Redundant descriptors may then be eliminated from the list. The list may be used to identify event descriptors within a textual communication. In another embodiment, the event descriptors are not necessarily associated with a particular template and are identified from a generic list. All of the identified descriptors are then either evaluated against templates or presented to users for selection. The selected descriptors are then compared with templates.

In one embodiment, the identified event descriptors are converted to selectable text and presented as selectable to the recipient of the textual communication. For example, the recipient may select the text by clicking on it with a pointing device. Other methods of selecting the text are also possible. The appearance of the descriptors may be changed to indicate to the recipient that it is selectable. For example, the descriptors may be underlined, double-underlined, highlighted, bolded, italicized, or any other appearance change that differentiates the selectable text from the surrounding nonselectable text. The recipient may then select descriptors that they want compared against templates. The selected descriptors are then compared to the templates to find a match. Upon finding a match, one or more suggested actions that are associated with the matching template are proposed to the user. The actions may be suggested in a separate user interface, or by modifying the user interface in which the textual communication is displayed, or by some other method.

Figure 3:
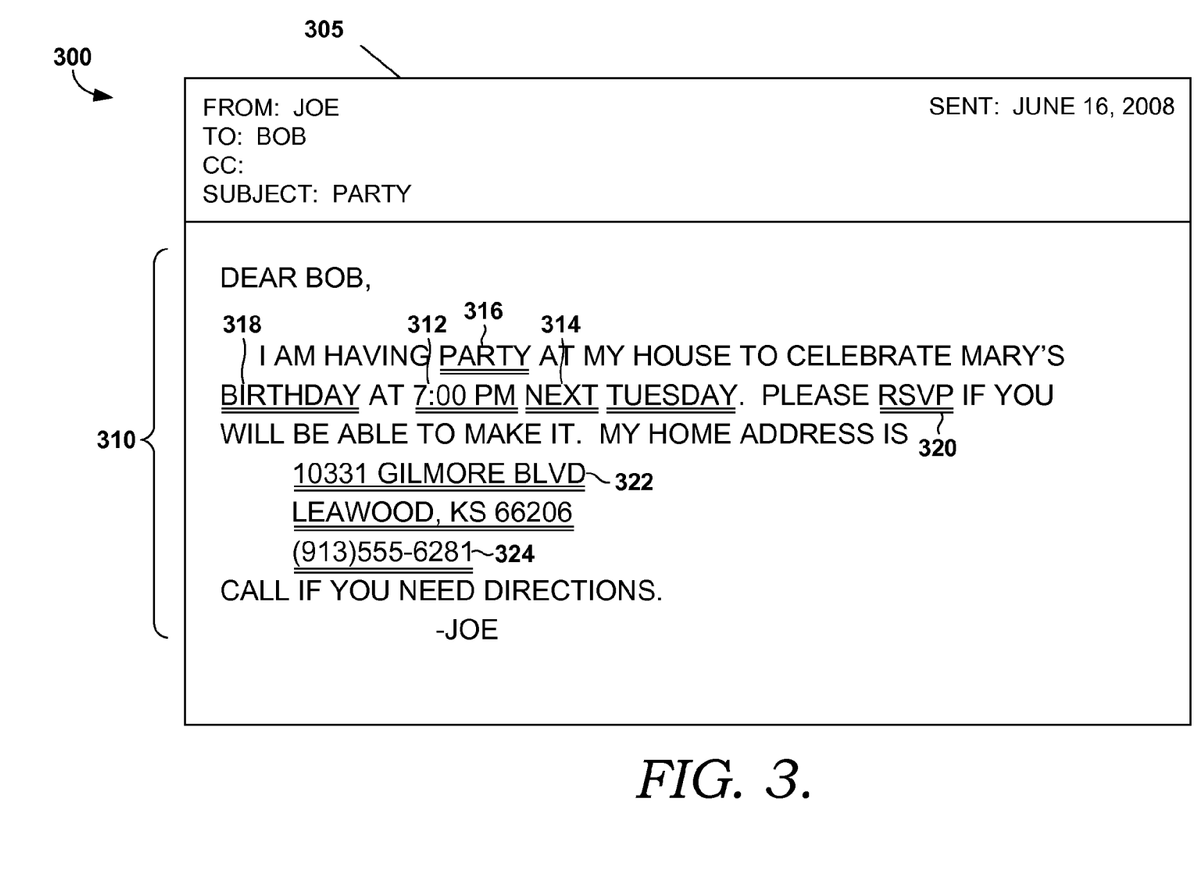
FIG. 3 is a drawing illustrating a graphical user interface displaying an email with descriptors identified and made selectable, in accordance with an embodiment of the present invention.

Turning now to FIG. 3, a graphical user interface displaying an email with descriptors identified and made selectable is shown, in accordance with an embodiment of the present invention. User interface 300 shows an email 305 from Joe to Bob with the subject "party" sent on Jun. 16, 2008. The body 310 of the email 305 contains several identified descriptors that have been converted to selectable text. The body 310 contains examples of both word descriptors and format descriptors. The word descriptors include "party" 316, "birthday" 318, "next Tuesday" 314, and "RSVP" 320. The format descriptors include 7 p.m. 312, address 322, and phone number 324. Format descriptors are identified by the format of the characters rather than the content. For example, the phone number could be identified as a ten-digit number with a hyphen between the third and fourth digits and the sixth and seventh digits. The descriptors party 316, birthday 318, and RSVP 320 could all be associated with a template seeking to identify emails that are an invitation to a social event. As described previously, all of the descriptors could be evaluated to determine if they match a template. If particular selections are received from the recipient of the email, just those descriptors could be compared against the templates. In one embodiment, the descriptors are identified, but are not displayed to the recipient as selectable. In that instance, all of the identified descriptors are evaluated against templates.

Figure 4:
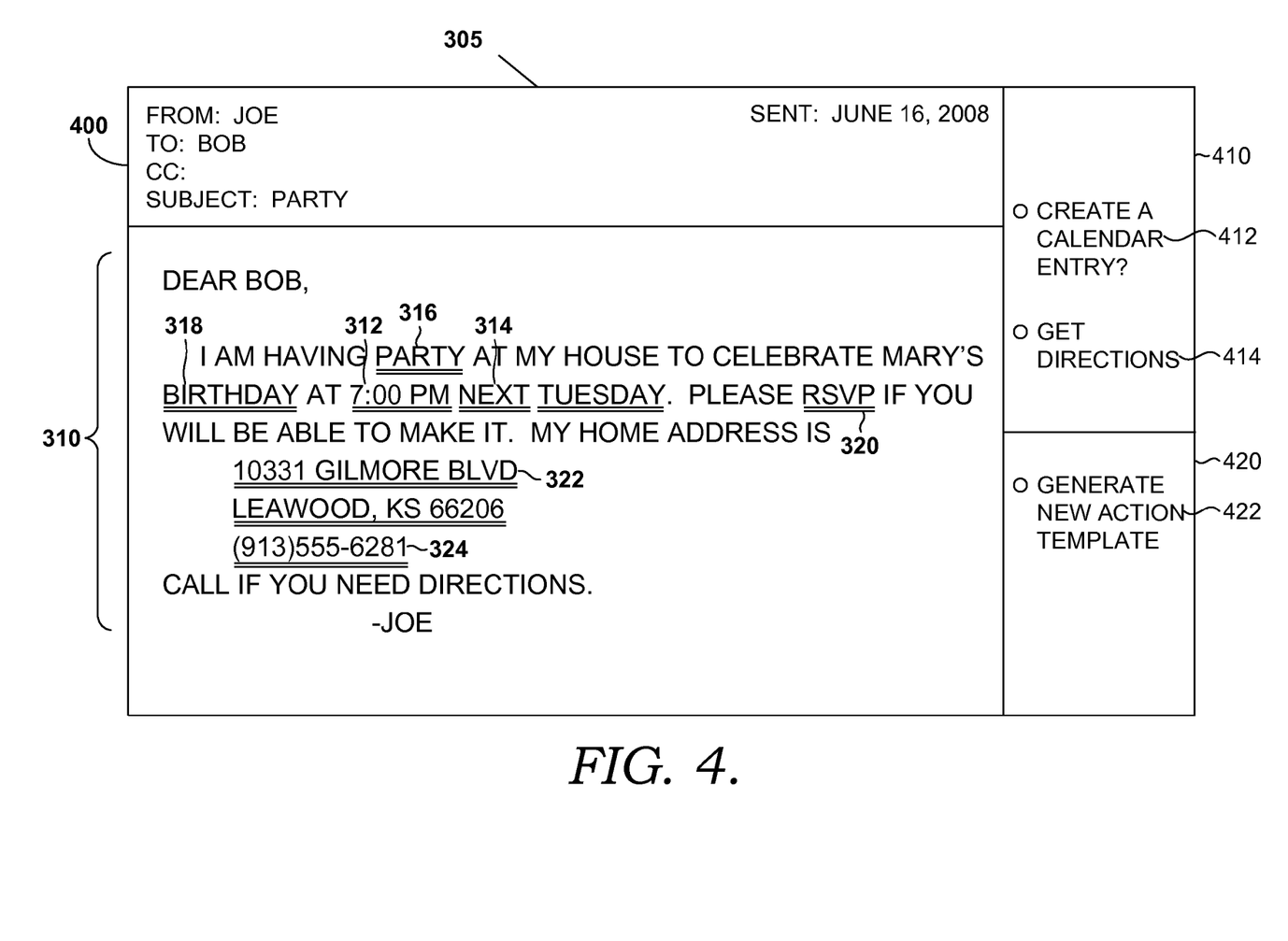
FIG. 4 is a drawing illustrating the presentation of suggested actions to the recipient, in accordance with an embodiment of the present invention.

Turning now to FIG. 4, the presentation of suggested actions to the recipient is shown in accordance with an embodiment of the present invention. User interface 400 contains the same email described in FIG. 3. In addition, user interface 400 contains a suggested action portion 410 and a template utility portion 420. The suggested action portion 410 contains two suggested actions. When selected, the calendar entry suggested action 412 creates a calendar entry based on the text in the body 310. When selected, the get directions suggested action 414 gets directions from a present location or designated location to the address 322. The calendar entry suggested action 412 may be displayed because the descriptors in the body 310 match a template associated with the calendar entry suggested action 412. A template may be associated with more than one suggested action. Thus, the get directions suggested action 414 may also be associated with the same template. In another embodiment, the calendar entry suggested action 412 is associated with a first template and the get directions suggested action 414 is associated with a second template. In this embodiment, the textual communication component 210 determined that the descriptors matched both the first and the second template. When more than one template matches the descriptors, multiple suggested actions may be displayed. In another embodiment, only one suggested action is displayed from the template with the highest degree of match.

The template utility portion 420 displays an option to generate a new template 422. By selecting the generate a new template 422 button, the user may be shown an interface that provides a guidance on creating a template to evaluate with future emails. The interface may lead to a wizard that helps the user create a new template to modify an existing template.

Upon selecting the suggested action to create a calendar entry 412, the textual communication component 210 creates a calendar entry in personal information manager 220 using at least the two descriptors from the body 310 of the email 305. For example, the calendar entry may include the time 7 p.m. on the date equal to the next Tuesday after Jun. 16, 2008. Address 322 and phone number 324 may also be included in the calendar entry. The calendar entry may then be presented to the recipient to update or save as desired. In one embodiment, the textual communication component 210 may retrieve directions from a default location, such as the recipient's place of work or home address, to the address 322 contained in the email 305. These directions may then be included in the calendar entry or presented separately to the recipient. The travel time between a location and the destination indicated in the body 310 may be used to modify the calendar entry. For example, the start time of the calendar entry may be adjusted to include the travel time. In another embodiment, a reminder is set to alert a user of the appointment so that there is enough time to travel to the appointment.

Upon selecting the get directions suggested action 414, the textual communication component 210 may access a navigation component 230 to obtain directions from a default location or the present location to the address 322 indicated in the email 305. The present location may be determined by a GPS system included within navigation component 230.

Figure 5:
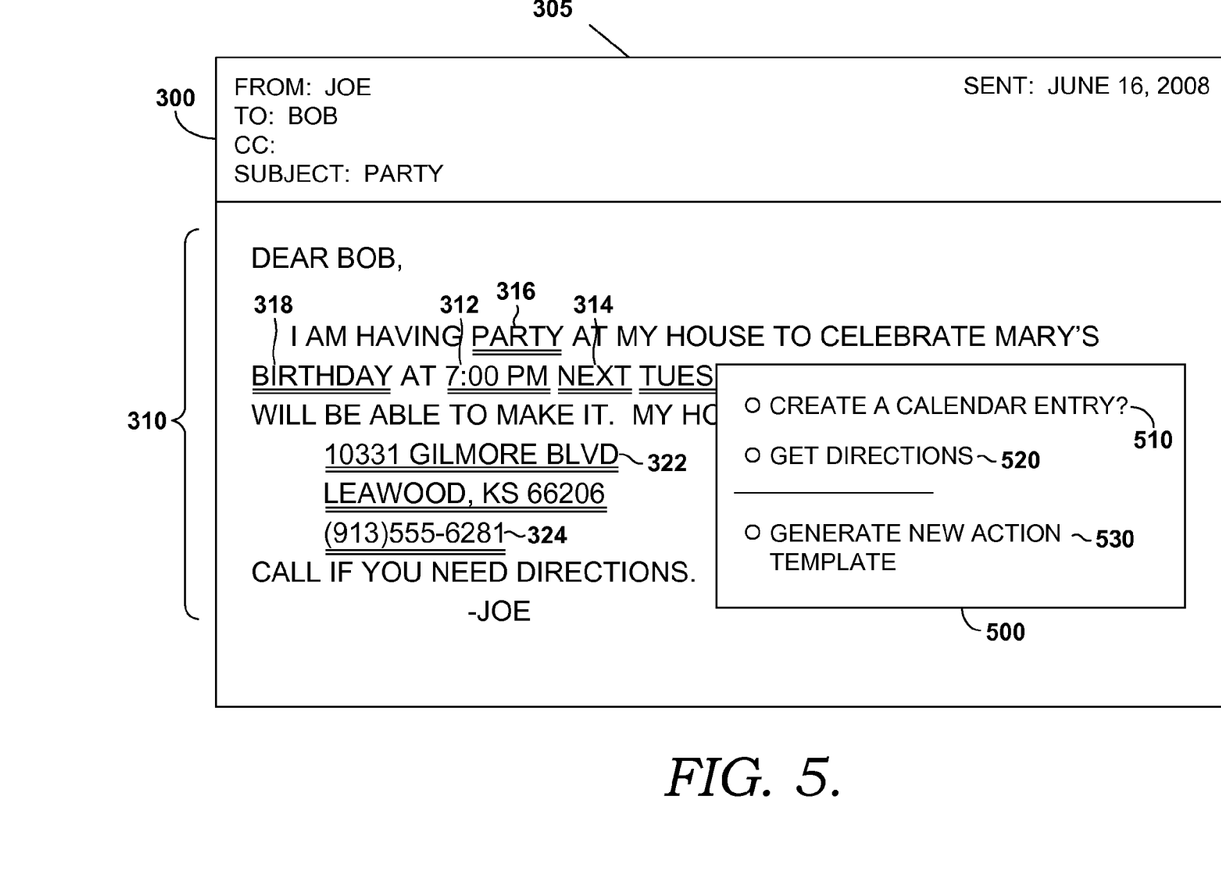
FIG. 5 is a drawing illustrating a user interface displaying suggested actions in a popup window, in accordance with an embodiment of the present invention.

Turning now to FIG. 5, a user interface displaying suggested actions in a popup window is shown in accordance with embodiments of the present invention. FIG. 5 shows user interface 300 with email 305 described with reference to FIG. 3. FIG. 5 also shows user interface 500 which is a popup window displayed overlaid on user interface 300. User interface 500 contains a calendar entry suggested action 510 and a get directions suggested action 520. User interface 500 also contains a button to generate a new action template 530. Buttons with similar functions have all been discussed previously with reference to FIG. 4.

Returning now to FIG. 2, the personal information manager 220 is a program that manages personal contact information, task information, calendar information and other personal data. The personal information manger may also be able to send and receive textual communications such as instant messages and email. In some commercial embodiments, the personal information manager 220 may be part of the same software program as textual communication component 210. The personal information manager 220 interacts with textual communication component 210 to receive instructions to perform actions associated with templates. Actions performed by the personal information manager 220 include creating a calendar event, creating a task event, and creating a new contact. In one embodiment, the personal information manager 220 does not perform actions specified by the textual communication component 210 but receives contact objects, calendar objects, and task objects created by the textual communication component 210 in a format that is compatible with the personal information manager 220.

A navigation component 230 provides directions between two points and may determine a present location using a GPS or other locating method. Navigation component 230 may be similar to components presently found on PDAs and cell phones to provide street directions utilizing GPS technology. In one embodiment, the navigation component 230 accesses directions from a mapping component (not shown) over the Internet. The directions may be transmitted to the textual communication component 210, a personal information manager 220, or to another component that displays the directions to the recipient of the textual communication.

The template data store 240 stores templates that are used to evaluate textual communications. As described previously, the templates contain descriptors that are matched with descriptors in a textual communication. The template is associated with a suggested action. When the textual communication component 210 matches the descriptors in an email with the descriptors in a template, the suggested action associated with that template is displayed to the recipient of the textual communication. The template data store may be a database, or other data structure suitable for storing the templates. A utility may be provided that allows the user to modify existing templates or create new ones.

Figure 6:
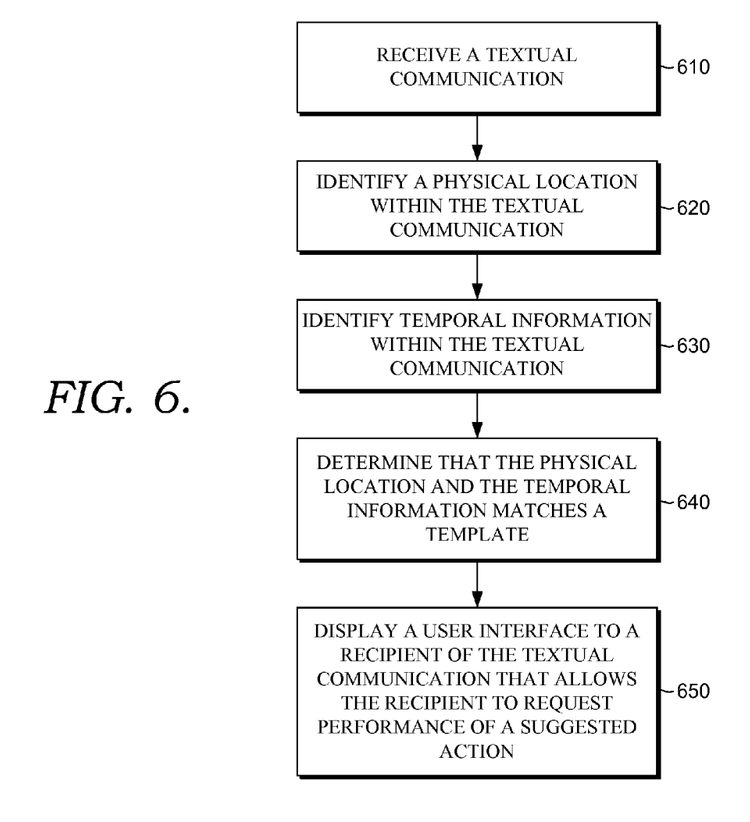
FIG. 6 is a flow diagram in which a method of performing an action in response to identifying information within a textual communication is described according to an embodiment of the present invention.

Turning now to FIG. 6, a method of performing an action in response to identifying information within a textual communication is shown in accordance with an embodiment of the present invention. At step 610, the textual communication is received. A textual communication is any form of digital communication containing text. In one embodiment, the textual communication is an email or a text message. In one embodiment, the textual communication does not originate from an electronic calendar. Thus, the textual communication is not a preformatted meeting request or calendar entry.

At step 620, a physical location within the body of the textual communication is identified. A physical location may be identified by comparing text within the textual communication to formats used to communicate a physical location such as an address. A physical location may also be identified by identifying words corresponding to a physical location such as the name of a state or city. As described previously, the formats and words used to identify a physical location may be drawn from a group of templates or from an independent source.

At step 630, temporal information within the textual communication is identified. Temporal information describes a point in time or a period of time. For example, temporal information may be a time of day, a date, a month, a day, or a phrase such as next Tuesday. As described previously, the temporal information may be identified using words or formats.

At step 640, the physical location and the temporal information are determined to match a template. The physical location and temporal information match a template when they are both included as descriptors in the template. As described previously, the template is associated with a suggested action. At step 650, a user interface containing the suggested action is displayed to a recipient of the textual communication. The user interface allows the recipient to request performance of the suggested action. In one embodiment, a user interface that allows a user to generate a new template or modify an existing template is also displayed with the suggested action. A newly created or modified template may be stored in a data store with pre-existing templates.

In one embodiment, the suggested action is retrieving travel reservation information based on the physical location in the textual communication and the temporal information. For example, transportation and lodging information may be retrieved and presented to the user to confirm a reservation or make a reservation. Examples of travel information include airline reservations, rental car information, and train reservations. The travel and lodging information may be generated using the physical location as a destination, a default location as the departure location, and the temporal information as a desired arrival time.

In one embodiment, the method further includes determining a time of travel between a default location and the physical location. The time of travel is used as part of a suggested action. In one embodiment, the suggested action is generating a calendar entry. The time of travel may be used to set a reminder time or other aspect of the calendar entry.

An indication from the user may be received to perform the suggested action. The method then includes automatically facilitating performance of the suggested action. Facilitating performance of the suggested action may include interacting with one or more separate programs that actually perform the action.

Figure 7:
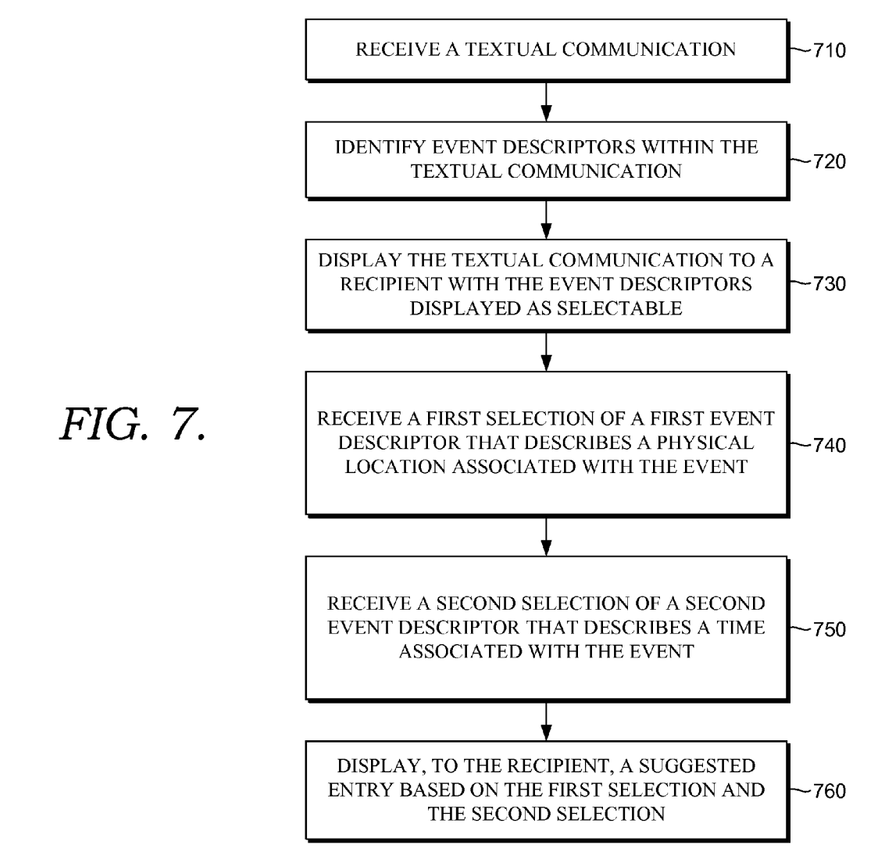
FIG. 7 is a flow diagram in which a method of generating an entry in a personal information manager based on information in a textual communication is described according to an embodiment of the present invention.

Turning now to FIG. 7, a method of generating an entry in a personal information manager based on information in a textual communication is shown in accordance with an embodiment of the present invention. At step 710, the textual communication is received. As stated previously, examples of textual communications include an email or a text message. At step 720, a plurality of event descriptors are identified within the textual communication. An event descriptor is text describing characteristics of an event. Examples of events include social events such as a birthday party or a wedding and business events such as conferences, conventions, and sales meetings. The event is associated with at least a physical location and a time period.

At step 730, the textual communication is displayed to a recipient with the plurality of event descriptors displayed as selectable. The appearance of the plurality of event descriptors is changed to indicate that the plurality of event descriptors are capable of selection by the recipient. For example, the plurality of event descriptors may be underlined, double underlined, highlighted, bolded, italicized, or the text color changed to differentiate it from surrounding text. Other methods of indicating that the text is selectable are also possible.

At step 740, a first selection of a first event descriptor from plurality of event descriptors is received. The first event descriptor describes the physical location associated with the event. At step 750, a second selection of a second event descriptor from the plurality of event descriptors is received. The second event descriptor describes a time associated with the event. At step 760, a suggested entry (e.g., calendar entry, task) based on the first selection and the second selection is displayed to the recipient. The entry includes a time consistent with the time associated with the event and the physical location associated with the event. The physical location may be included in a specific field of the entry, under a general description of the entry, or in some other part of the entry. In one embodiment, one or more event types that correlate with the first selection and the second selection are displayed to the recipient. The recipient selects a first event type. The suggested entry may then be created based on the event type selected by the user.

In one embodiment, the method further includes determining a time of travel between a default location and a physical location of the event. The time of travel may then be used to update the suggested entry, as described previously. In one embodiment, the selection of additional event descriptors are received from the user. When appropriate, these event descriptors may be incorporated into the suggested entry. For example, the selection of a person may cause the suggested entry to include the selected person in a description or other part of the entry.

Figure 8:
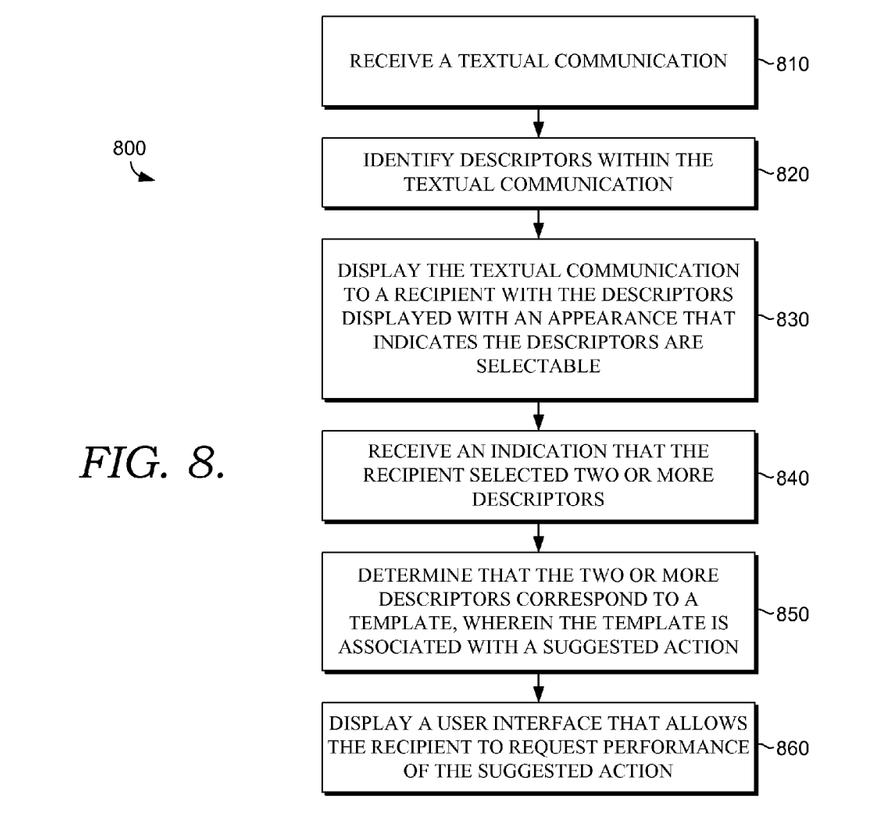
FIG. 8 is a flow diagram in which a method of performing an action in response to identifying information within a textual communication is described according to an embodiment of the present invention.

Turning now to FIG. 8, a method of performing an action in response to identifying information within a textual communication is shown in accordance with an embodiment of the present invention. At step 810, the textual communication is received. The textual communication is one or more of a text message and an email. At step 820, a plurality of descriptors within the textual communication are identified. A descriptor is a series of alpha numerical characters within a body of the textual communication. At step 830, the textual communication is displayed to a recipient with the plurality of descriptors displayed with an appearance that indicates that the plurality of descriptors are selectable.

At step 840, an indication that the recipient selected two or more descriptors is received. At step 850, the two or more descriptors are determined to correspond to a template. The template is associated with a suggested action. At step 860, a user interface that allows the recipient to request performance of the suggested action is displayed. In one embodiment, the suggested action includes one or more of generating a personal contact entry, generating a business contact entry, generating a task entry, generating a calendar entry, and any combination thereof. In one embodiment, the two or more descriptors include a business name, business hours, and a business address. The proposed action in this embodiment is generating a business contact entry. In one embodiment, the user interface allows the user to generate a new template or modify an existing template. The new templates and modified templates contain at least two or more descriptors.

In one embodiment, a time of travel between a present location and a business address that is one of the two or more descriptors is determined. A message is displayed to the recipient indicating whether the recipient has sufficient time to arrive at the business address during business hours if the recipient began traveling toward the business address immediately. A person has enough time to reach the business within business hours if the closing time of the business minus the time of travel is after the present time.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of performing an action in response to identifying information within a textual communication, the method comprising:
   receiving the textual communication, wherein the textual communication does not originate from an electronic calendar;
   identifying a physical location within the textual communication;
   identifying temporal information within the textual communication;
   determining that the physical location and the temporal information matches a template for travel reservations;
   retrieving travel reservation information that has the physical location as a destination and an arrival time based on the temporal information;
   displaying a user interface to a recipient of the textual communication that allows the recipient to make travel reservations using the travel reservation information;
   receiving, from the recipient, an indication to make the travel reservations; and
   automatically facilitating the making of the travel reservations, wherein the reservations are not made by a program receiving the textual communication.

2. The media of claim 1, wherein the textual communication is one or more of an email, a webpage, and a text message.

3. The media of claim 1, wherein determining that the physical location and the temporal information correspond to the template includes evaluating a context of the temporal information and the physical location within the textual communication.

4. The media of claim 1, wherein the method further comprises:
   determining a time of travel between a default location and the physical location; and
   using the time of travel as part of the travel reservation information.

5. The media of claim 1, wherein the method further comprises:
   providing a user interface that allows a user to generate the template, wherein two or more types of information are associated with the template and a suggested action is associated with the template; and
   storing the template in a data store configured for storing a plurality of templates.

6. One or more non-transitory computer-readable media having computer-executable instructions embodied thereon for performing a method of generating making travel reservations based on information in a textual communication, the method comprising:
   receiving the textual communication;
   identifying a plurality of event descriptors within the textual communication, wherein an event descriptor is text describing characteristics of an event, and wherein the event is associated with at least a physical location and a time;
   displaying the textual communication to a recipient with the plurality of event descriptors displayed as selectable, wherein the plurality of event descriptors appearance is changed to indicate the plurality of event descriptors are capable of selection by the recipient;
   receiving a first selection of a first event descriptor from the plurality of event descriptors, wherein the first event descriptor describes the physical location associated with the event;
   receiving a second selection of a second event descriptor from the plurality of event descriptors, wherein the second event descriptor describes the time associated with the event;
   retrieving travel reservation information that has the physical location as a destination and an arrival time based on the time;
   displaying a user interface to a recipient of the textual communication that allows the recipient to make travel reservations using the travel reservation information;
   receiving, from the recipient, an indication to make the travel reservations; and
   automatically facilitating the making of the travel reservations, wherein the reservations are not made by a program receiving the textual communication.

7. The media of claim 6, wherein the appearance includes one or more of underlining, double underlining, highlighting, changing text color, bold, and italics.

8. The media of claim 6, wherein the method further comprises:
   determining a time of travel between a default location and a departure location associated with the travel reservations; and
   using the time of travel to set a time element for a calendar entry.

9. The media of claim 8, wherein method further comprises including a departure time in the calendar suggested entry based on the time of travel.

10. The media of claim 8, wherein the method further comprises:
    receiving a third event descriptor from the plurality of event descriptors, wherein the third event descriptor describes a person associated with the event;
    retrieving contact information for the person from the personal information manager; and
    including the contact information in the calendar entry.

11. One or more non-transitory computer-readable media having computer-executable instructions embodied thereon for performing a method of performing an action in response to identifying information within a textual communication, the method including:
    receiving the textual communication, wherein the textual communication is one of a text message and an email;

identifying a plurality of descriptors, wherein a descriptor is a series of alphanumeric characters within a body of the textual communication;

displaying the textual communication to a recipient with the plurality of descriptors displayed with an appearance that indicates the plurality of descriptors are selectable;

receiving an indication that the recipient selected two or more descriptors, wherein the two of more descriptors describe at least a physical location and a time;

determining that the two or more descriptors correspond to a template for travel reservations, retrieving travel reservation information that has the physical location as a destination and an arrival time based on the time;

displaying a user interface to a recipient of the textual communication that allows the recipient to make travel reservations using the travel reservation information;

receiving, from the recipient, an indication to make the travel reservations; and automatically facilitating the making of the travel reservations, wherein the reservations are not made by a program receiving the textual communication.

12. The media of claim 11, wherein the method further comprises:

providing a user interface that allows a user to generate the template, wherein two or more types of information are associated with the template and a suggested action is associated with the template; and storing the template in a data store configured for storing a plurality of templates.

13. The media of claim 11, wherein the suggested action includes one or more of generating a personal contact entry, generating a business contact entry, generating a task entry, generating a calendar entry, and making a travel reservation.

14. The media of claim 11, wherein the method further comprises:

determining a time of travel between a present location and a departure location associated with the travel reservations; and displaying a message to the recipient indicating whether the recipient has sufficient time to arrive at to the departure location if the recipient began traveling towards the departure location immediately.

15. The media of claim 11, wherein the method further comprises displaying one or more alternate suggested actions to the recipient concurrently with the user interface that allows the recipient to make travel reservations.

16. The media of claim 15, wherein the method further comprises:

receiving an indication from the recipient to perform one or more of an alternate suggested action and make travel reservations; and facilitating performance of the alternate suggested action.

\* \* \* \* \*